Aug. 2, 1955
C. H. THOMPSON
2,714,527
SLIDABLE COVER FOR PORTABLE SPRAYER
Filed Jan. 5, 1953
2 Sheets-Sheet 1
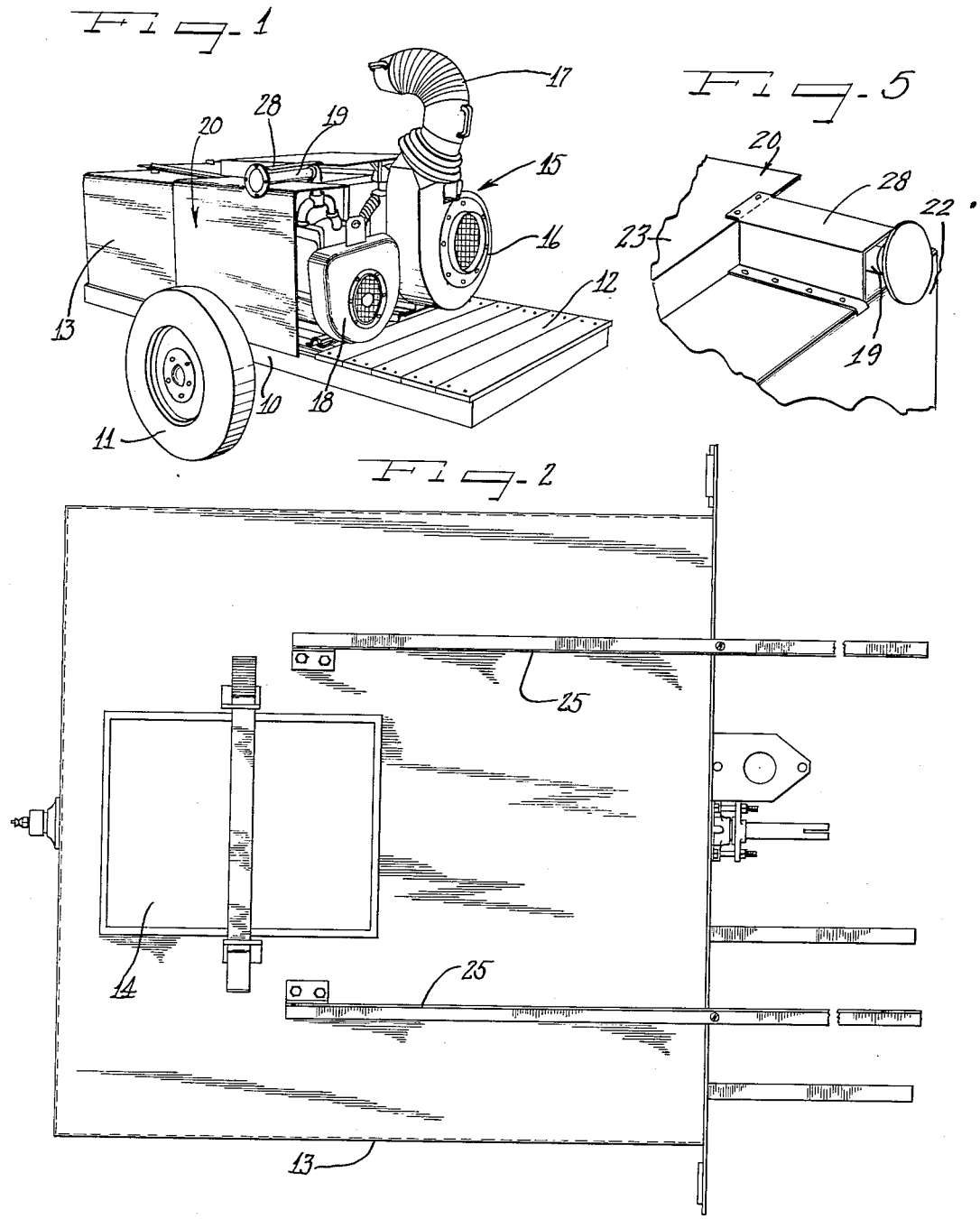
Inventor
Clayton H. Thompson

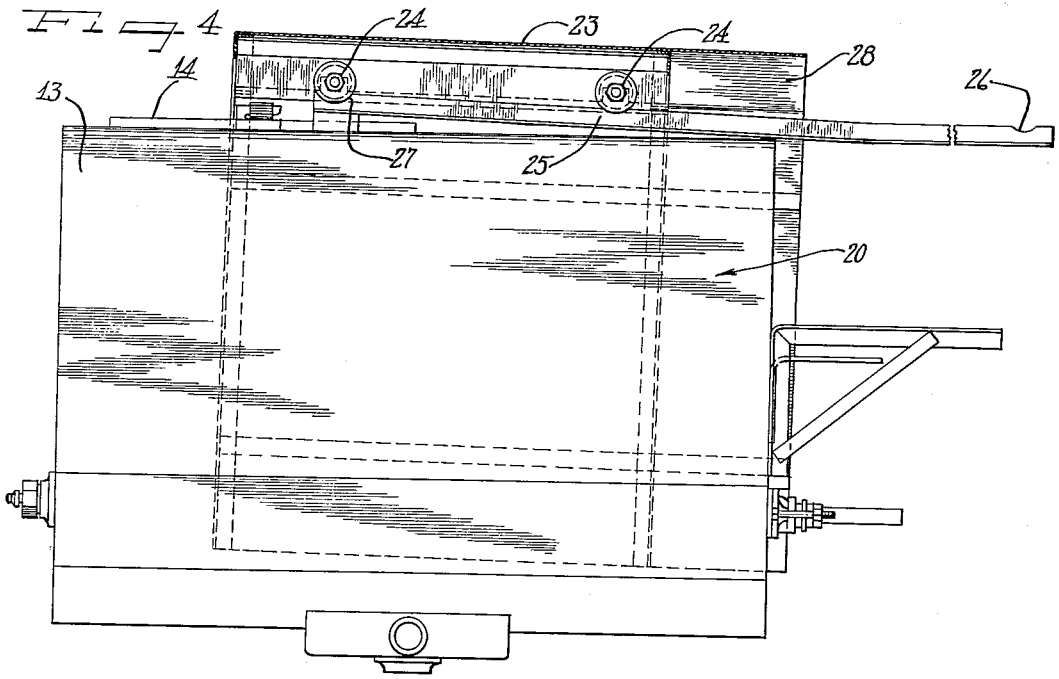
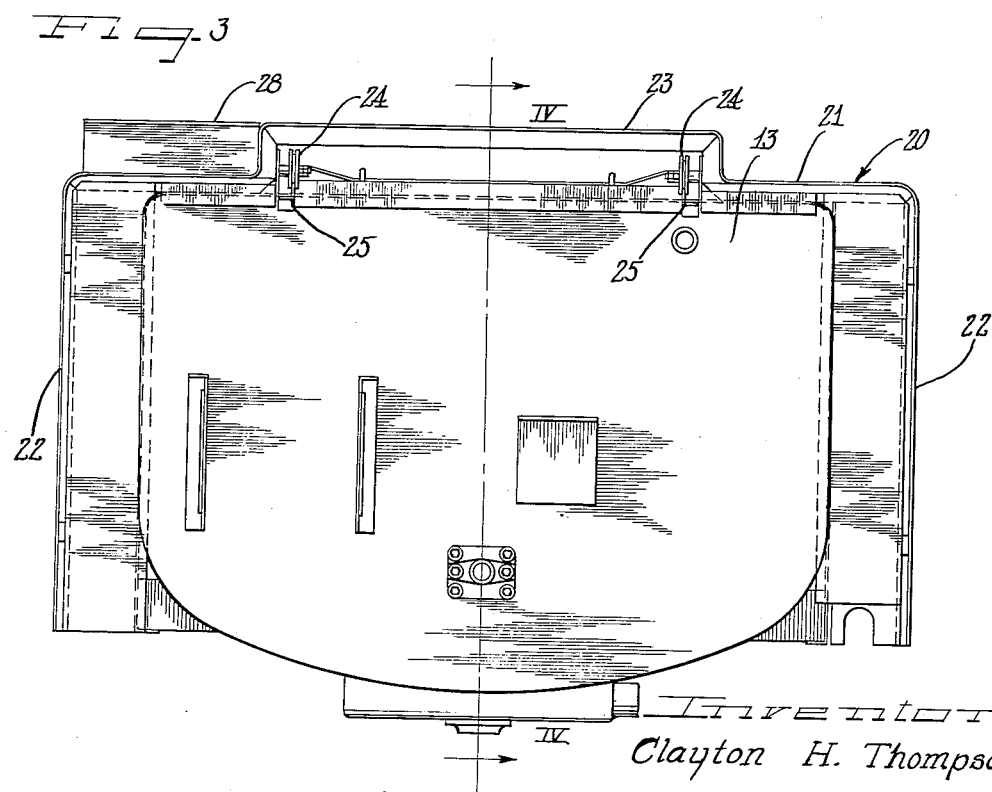

United States Patent Office 2,714,527
Patented Aug. 2, 1955

2,714,527

SLIDABLE COVER FOR PORTABLE SPRAYER

Clayton H. Thompson, Elgin, Ill., assignor to Elgin Sweeper Company, Elgin, Ill., a corporation of Illinois Application January 5, 1953, Serial No. 329,529

7 Claims. (Cl. 299—29)

This invention relates to portable insecticide sprayers and more particularly to a slidable cover structure therefor.

In the use of portable sprayers, such as are used by municipalities and farmers for killing insects, it becomes desirable to cover the spray operating mechanism from the constantly falling spray material. Numerous efforts have been made to cover such mechanism with hinged covers and the like but have not proven satisfactory because exposed parts, such as hinges, quickly corrode due to their being continuously exposed to corrosive spray material.

In addition, such previous hinged covers did not present a continuous unbroken surface wherein spray particles could not work their way through; and also they only permitted limited room for making repairs, greasing and the like.

It is, accordingly, an object of this invention to provide a simple readily movable cover for a portable sprayer which presents a substantially unbroken exterior surface and which can be readily moved from mechanism covering position to a position for exposing and making easily accessible the spray operating mechanism.

Another object of the invention is to provide a simple rolling type cover for a sprayer and which will automatically retain itself in either one of two positions to which it is manually moved.

In accordance with the general features of this invention there is provided in a portable sprayer including a chassis having thereon a tank of material to be sprayed and spray operating mechanism on the chassis at one end of the tank, a generally U-shaped cover extending over and along the sides of the tank and a slide mechanism between the cover and tank extending generally lengthwise of the tank and chassis and supporting the cover for sliding movement in one direction to extend over the spray mechanism and also for sliding movement in an opposite direction over the tank to expose the spray mechanism for access thereto.

Another feature of the invention relates to inclining the slide mechanism so that the cover, when it is moved over the sprayer tank, can move upwardly to clear the top of the filler cap on the tank.

Yet, another feature of the invention relates to providing the cover with an extension which serves as a covering guard for the hot exhaust pipe of the prime mover used to actuate the blower of the sprayer.

Other objects and features of this invention will more fully appear from the following detailed description taken in connection with the accompanying drawings which illustrate a single embodiment thereof and in which:

Figure 1 is a perspective view of a portable sprayer equipped with my novel slidable type cover;

Figure 2 is an enlarged plan view of the tank on the sprayer showing it equipped with the tracks of my sliding mechanism and with the cover and parts of the mechanism omitted;

Figure 3 is an end view of the tank and cover assembly taken to the rear of the sprayer mechanism and with the sprayer mechanism omitted;

2

Figure 4 is a fragmentary cross-sectional view taken on substantially the line IV—IV of Figure 3 looking in the direction indicated by the arrows and showing the cover moved forward on the tank in a position in which the operating mechanism would be uncovered and exposed; and Figure 5 is a fragmentary perspective view showing more clearly the exhaust pipe cover detail.

As shown on the drawings:

Referring to Figure 1 the reference character 10 designates generally the chassis of a portable sprayer carried on wheels 11, one of which is shown. The chassis has bolted on its rear end a platform 12 on which an operator may stand for manipulating the sprayer.

The other and front end of the chassis 10 carries a tank 13 for holding the insecticide material to be sprayed. This front end of the vehicle may be attached by any suitable coupling means (not shown) to the conveying vehicle or track for propelling the portable sprayer over the ground and along the countryside to be sprayed. The tank 13 has a cap 14 which is removable to permit filling of the tank with spray material.

Located at the rear of the tank 13 and between the tank and the platform 12 is a sprayer which includes a blower 16 and a manually movable nozzle 17 adapted to be manipulated by the operator standing on the platform for the effective spraying of the countryside, orchard or the like. Positioned to one side and extending rearwardly from the blower 16 is a sprayer actuating mechanism 18 including a prime mover having an exhaust pipe 19 mounted adjacent the rear end of the tank 13. My invention is concerned with providing a cover for this sprayer mechanism 18 so as to assist in shielding it from the downwardly gravitating mist like spray emanating from the nozzle 17. I have designated my novel slidable cover generally by the reference numeral 20.

In Figure 1, the cover is shown in a mechanism covering position whereas in Figure 4 it is shown in a position wherein it is moved forwardly over the tank to expose the sprayer actuating mechanism 18.

This cover is generally of a U-shaped cross section and may be made from any suitable sheet metal. By reason of the fact that the cover is of a one-piece structure, it presents a substantially unbroken surface to any spray mist gravitating thereon.

As best shown in Figure 3, the cover 20 includes a top 21 and two parallel sides or legs 22—22. The top has a raised section 23 in which is disposed the rollers 24 for slidably supporting the cover on parallel tracks 25—25. It will be clear from Figures 3 and 4 that the cover has two pair of rollers 24, there being one pair for each of the trackways 25. Each roller is preferably equipped with an anti-frictional bearing (not shown) of any conventional construction for facilitating moving of the roller along the trackway.

The parallel tracks 25—25 (Figure 2) comprise angular channel arms suitably bolted or otherwise secured to the top of the tank 13 below the raised section 23 of the cover. Attention is directed to the fact that each track, as best shown in Figure 4, is inclined rearwardly and downwardly toward the sprayer mechanism so that the cover 20, as it is moved forward over the tank to expose the mechanism, can clear the filler cap 14. Also, each track has a roller receiving notch 26 at its rear extremity and a similar notch 27 at its front extremity. These notches serve to hold the rollers and thereby the cover in either the rearward or forward positions, such as the case might be. Furthermore, by having the trackway slightly inclined rearwardly, the cover will more readily stay in its covering position since it has to be moved upwardly in order to move it to an uncovering position. The antifrictional rollers 24, however, facilitate easy manual sliding of the cover to either of its two positions.

Attention is also directed to the fact that the cover, as best shown in Figures 4 and 5, is provided with an integral angular sheet metal extension 28 which fits around one side and over the top of the hot exhaust pipe 19 when the cover is in its mechanism covering position. This feature is advantageous in that it enables the cover to serve as a guard or shield for assisting in preventing manual contact with this hot exhaust pipe.

I claim as my invention:

1. In a portable sprayer, a chassis, a tank of material to be sprayed thereon, operating mechanism on the chassis at one end of the tank for dispensing the material to be sprayed from the tank, a generally U-shaped cover extending over and along the sides of said tank and a slide mechanism between the cover and tank extending generally lengthwise of the tank and chassis and supporting the cover for longitudinal sliding movement in one direction to extend over the operating mechanism and also for sliding movement in an opposite direction over the tank to expose the operating mechanism for access thereto.

2. In a portable sprayer, a chassis, a tank of material to be sprayed thereon, operating mechanism on the chassis at one end of the tank for dispensing the material to be sprayed from the tank, a generally U-shaped cover extending over and along the sides of said tank and a slide mechanism between the cover and tank extending generally lengthwise of the tank and chassis and supporting the cover for longitudinal sliding movement in one direction to extend over the operating mechanism and also for sliding movement in an opposite direction over the tank to expose the operating mechanism for access thereto, said slide mechanism including a track over the tank inclined downwardly in a direction toward the operating mechanism and roller means on the underside of the cover riding in said track.

3. In a portable sprayer, a chassis, a tank of material to be sprayed thereon, provided with a detachable filler cap and operating mechanism on the chassis at one end of the tank for dispensing the material to be sprayed from the tank, a generally U-shaped cover extending over and along the sides of said tank and a slide mechanism between the cover and tank extending generally lengthwise of the tank and chassis and supporting the cover for sliding movement in one direction to extend over the operating mechanism and also for longitudinal sliding movement in an opposite direction over the tank to expose the operating mechanism for access thereto, said slide mechanism including a track over the tank inclined downwardly in a direction toward the operating mechanism and roller means on the underside of the cover riding in said track, said track being notched at opposite ends for receiving and retaining the roller means depending upon which direction the cover is moved, said roller means being readily disengageable from the notches upon manual pressure being applied to the cover for sliding it from one of said positions to the other, the inclination of the track being of such extent as to afford clearance for the cover to ride up over the filler cap when the cover is slid from over the operating mechanism.

4. In a portable sprayer, a chassis, a tank of material to be sprayed thereon, operating mechanism on the chassis at one end of the tank for dispensing the material to be sprayed from the tank, a cover extending over and along the sides of said tank and a slide mechanism between the cover and tank extending generally lengthwise of the tank and chassis and supporting the cover for sliding movement in one direction to extend over the operating mechanism and also for longitudinal sliding movement in an opposite direction over the tank to expose the operating mechanism for access thereto, said slide mechanism including a track over the tank inclined downwardly in a direction toward the operating mechanism and roller means on the underside of the cover riding in said track, said track being notched at opposite ends for receiving and retaining the roller means depending upon which direction the cover is moved, and said roller means being readily disengageable from the notches upon manual pressure being applied to the cover for sliding it from one of said positions to the other.

5. In a portable sprayer, a chassis, a tank of material to be sprayed thereon, operating mechanism on the chassis at one end of the tank for dispensing the material to be sprayed from the tank and including an exhaust pipe projecting to one side of the tank, a cover extending over and along the sides of said tank and a slide mechanism between the cover and tank extending generally lengthwise of the tank and chassis and supporting the cover for longitudinal sliding movement in one direction to extend over the operating mechanism and also for sliding movement in an opposite direction over the tank to expose the operating mechanism for access thereto, said cover having a laterally projecting extension for movement over the exhaust pipe when the cover is moved in a direction to cover the operating mechanism and so as to minimize the likelihood of manual contact with the exhaust pipe and to prevent damage by the material to be sprayed.

6. A portable sprayer, a chassis, a tank of material to be sprayed carried by said chassis, operating mechanism on the chassis at one end of the tank for dispensing the material to be sprayed from the tank, a protective cover having an unbroken surface for resisting corrosion of sprayed particles including opposed vertical portions suspended along the sides of said tank and a dished portion joining the opposed vertical portions to form a composite cover, and a slide mechanism housed in the dished portion of the cover between the cover and tank extending generally lengthwise of the tank and chassis and supporting the cover for longitudinal sliding movement in one direction to extend over the operating mechanism and also for sliding movement in an opposite direction over the tank to expose the operating mechanism for ready access.

7. A portable sprayer, a chassis, a tank of material to be sprayed carried by said chassis, operating mechanism on the chassis at one end of the tank for dispensing the material to be sprayed from the tank, a protective cover having an unbroken surface for resisting corrosion of sprayed particles including opposed vertical portions suspended along the sides of said tank and a dished portion joining the opposed vertical portions to form a composite cover, and a slide mechanism housed in the dished portion of the cover between the cover and tank extending generally lengthwise of the tank and chassis and supporting the cover for longitudinal sliding movement in one direction to extend over the operating mechanism and also for sliding movement in an opposite direction over the tank to expose the operating mechanism for ready access, said sliding mechanism including a track over the tank inclined downwardly in a direction toward the operating mechanism and roller means on the underside of the cover riding in said track, said track being notched at opposite ends for receiving and retaining the roller means depending upon which direction the cover is moved, said roller means being readily disengageable from the notches upon manual pressure being applied to the cover for sliding it from one of said positions to the other.

References Cited in the file of this patent

UNITED STATES PATENTS

| | | |
|---|---|---|
| 1,193,347 | Bauer | Aug. 1, 1916 |
| 1,681,062 | Sparshott | Aug. 14, 1928 |
| 2,159,022 | Hawkins | May 23, 1939 |
| 2,331,107 | Daugherty | Oct. 5, 1943 |
| 2,549,938 | Seaman, Jr. | Apr. 24, 1951 |
| 2,587,240 | Spreng | Feb. 26, 1952 |